United States Patent [19]

Reinke

[11] 4,446,523

[45] May 1, 1984

[54] MASS AIR FLOW METER

[75] Inventor: Paul E. Reinke, Rochester, Mich.

[73] Assignee: General Motors Corporation, Detroit, Mich.

[21] Appl. No.: 321,117

[22] Filed: Nov. 13, 1981

[51] Int. Cl.³ .............................................. G06F 15/20
[52] U.S. Cl. ............................ 364/431.05; 73/861.52; 364/510
[58] Field of Search .......................... 364/510, 431.05; 73/861.42, 861.47, 861.52, 861.61; 123/480, 486

[56] References Cited

U.S. PATENT DOCUMENTS

| | | | |
|---|---|---|---|
| 3,952,577 | 4/1976 | Hayes et al. | 73/861.52 |
| 4,264,961 | 4/1981 | Nishimura et al. | 364/510 |
| 4,309,971 | 1/1982 | Chiesa et al. | 364/431.05 |

Primary Examiner—Errol A. Krass
Attorney, Agent, or Firm—Howard N. Conkey

[57] ABSTRACT

A mass air flow meter for an internal combustion engine is described in which the mass air flow into the engine is determined by the measured throttle angular position, the sensed pressure above the throttle and a stored schedule of values dependent upon the ratio of the pressure below the throttle to the pressure above the throttle.

2 Claims, 4 Drawing Figures

MASS AIR FLOW METER

This invention relates to a mass air flow meter and specifically relates to such a meter for an internal combustion engine having an intake manifold, an induction passage opening from an air inlet to the intake manifold and including a throttle bore and a variable position throttle in the throttle bore for varying the effective area of the induction passage to regulate the air flow into the intake manifold.

Numerous systems have been proposed for measuring the mass rate of air flow into an internal combustion engine. Generally, these systems require an air flow sensing element positioned in the air stream to sense air flow. For example, some prior systems provide for a vane that is moved by the air flow to an angular position which is a measure of air flow. Other systems employ a constant temperature anemometer positioned in the air stream.

As opposed to the foregoing form of air flow sensors, in the present invention, the mass rate of air flow into an internal combustion engine is determined without the addition of an air flow sensing element and without differentiating between sonic and subsonic air flows by using the position of the throttle valve in the engine air induction passage, the air pressure above and below the throttle valve and a stored schedule of values of a pressure ratio dependent air flow driving function. Accordingly, the general object of this invention is to provide an improved mass rate of air flow meter for an internal combustion engine that does not require the addition of an air flow sensing element in the air induction passage of the internal combustion engine.

It is another object of this invention to provide an improved mass air flow sensor for an internal combustion engine employing the throttle valve of the internal combustion engine in conjunction with a stored schedule of pressure ratio dependent air flow driving functions.

It is another object of this invention to provide for a mass air flow meter for an internal combustion engine having an air throttle valve utilizing the angular position of the throttle valve, the pressures on each side of the throttle valve, and a stored schedule of air flow driving functions and which does not require the distinction between sonic and subsonic air flows through the throttle valve.

These and other objects of this invention may be best understood by reference to the following description of a preferred embodiment and the drawings in which.

Figure 1:
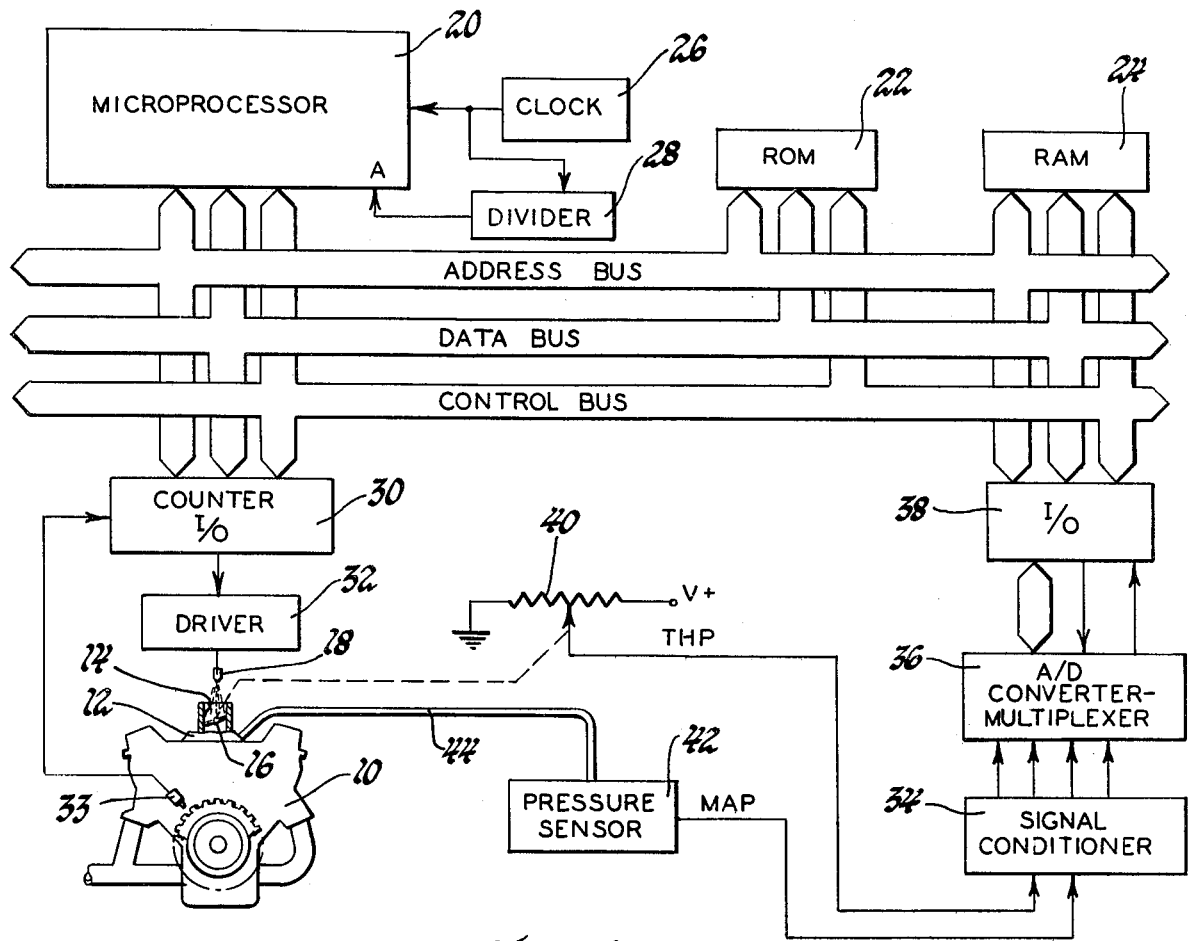
FIG. 1 illustrates a digital system used with an internal combustion engine for providing mass air flow measurements in accord with the principles of this invention.

Referring to FIG. 1, an internal combustion engine 10 includes an induction passage opening from the atmosphere into an intake manifold 12. The intake passage includes a throttle bore 14 having a variable position throttle 16 therein for varying the effective area of the induction passage to regulate the air flow into the intake manifold 12.

The mass air flow measurement system of this invention is described in conjunction with a fuel control system for the engine 10 wherein a fuel injector 18 is controlled to inject fuel into the throttle bore 14 above the throttle 16. The amount of fuel injected is based on the measured mass air flow into the engine so as to establish a desired air/fuel ratio.

The digital system for measuring the mass air flow into the engine 10 and for controlling the fuel injector 18 includes a microprocessor 20 which executes an operating program permanently stored in an external read-only memory (ROM) 22. The ROM 22 also contains lookup tables addressed in accord with selected engine parameters as will be described in determining the mass air flow into the engine 10.

Internal to the microprocessor 20 are conventional counters, registers, accumulators, flag flip-flops, etc. Such a microprocessor may take the form of a Motorola MC-6800 Series Microprocessor. The digital system also includes a random access memory (RAM) 24 into which data may be temporarily stored and from which data may be read at various address locations determined in accord with the program stored in the ROM 22. A clock oscillator 26, which establishes the timing of the digital system, supplies a clock signal to the microprocessor 20 and to a divider 28 which issues a periodic interrupt pulse to a maskable interrupt A input of the microprocessor 20. These interrupt pulses may be spaced at, for example, $12\frac{1}{2}$ millisecond intervals.

A counter input/output circuit 30 is provided having an output counter section for providing timed output pulses for energizing the fuel injector 18 via a driver circuit 32 and an input counter section responsive to speed pulses provided by a speed pickup 33 which senses rotation of the engine flywheel. In general, the output counter section of the counter input/output circuit 30 may include registers into which binary numbers representative of the desired fuel pulse width are periodically inserted. Thereafter at times determined by the microprocessor 20, the numbers are gated into down counters which are clocked by clock pulses with the output pulses of the output counter section having durations equal to the time required for the down counters to be counted down to zero. In this respect, the output pulse may be provided by a flip-flop that is set when the number in the register is gated into the down counter and reset by a carryout signal from the down counter when the number is counted to zero. The input counter section of the circuit 30 counts speed pulses from the pickup 33 for a predetermined time period to measure the speed of the engine 10 or, alternatively, counts clock pulses between input speed pulses to measure engine speed.

To provide for the measurement of analog signals, the digital controller includes a signal conditioner 34 which receives the various analog signals and whose outputs are coupled to an analog-to-digital converter-multiplexer 36. The particular analog condition sampled and converted is controlled by the microprocessor 20 in accord with the operating program stored in the ROM 22 via address lines from the input/output interface of an input/output circuit 38. Upon command, the addressed condition is converted to digital form and supplied to the input/output circuit 38 and then stored in ROM designated memory locations in the RAM 24.

In the present invention, the inputs to the signal conditioner 34 which are utilized in determining the mass rate of air flow into the engine 10 are a throttle position signal THP provided by a potentiometer 40 whose wiper arm is positioned by rotation of the throttle 16 and a manifold absolute pressure signal MAP provided by a pressure sensor 42 sensing the manifold absolute pressure via a conduit 44. Additional analog voltages may be applied to the signal conditioner 34 as required, for example in the control of the fuel injector 18. For example, a temperature signal representing engine coolant temperature may be provided to the signal conditioner 34 to enable control of fuel enrichment during cold engine operation.

The input/output circuits 30 and 38 are conventional circuits for providing the respective functions. While the circuits have been illustrated as being separate, they may be combined in one or more input/output interface circuits.

The microprocessor 20, the ROM 22, the RAM 24 and the input/output circuits 30 and 38 are interconnected by an address bus, a data bus and a control bus. The microprocessor 20 accesses the various circuits and memory locations in the ROM 22 and the RAM 24 via the address bus. Information is transmitted between circuits via the data bus and the control bus includes conventional lines such as read/write lines, reset lines, clock lines, power supply lines, etc.

Air flow through the orifice area defined by the throttle 16 and into the engine 10 may be either sonic or subsonic depending upon the engine operation. For sonic air flow through the orifice defined by the throttle 16, the mass rate of air flow into the engine 10 is defined by the following expression:

$$\dot{m} = AP_1 \sqrt{\frac{2g}{RT}} \left[ \frac{K}{K+1} \left( \frac{2}{K+1} \right)^{2/(K-1)} \right]^{\frac{1}{2}} \quad (1)$$

where A is the effective orifice area defined by the throttle 16, $P_1$ is the pressure above the throttle 16 and which is substantially equal to atmospheric pressure, g is a constant which is the ratio of 1 slug to 1 pound, R is a gas constant, T is the absolute inlet air temperature, and K is a specific heat ratio and is assumed to be a constant for the normal range of ambient air temperature.

Assuming K to be a constant for a normal range of ambient temperature air and assuming a constant air temperature, equation (1) can be transformed to the expression:

$$\dot{m} = C_S A P_1 \sqrt{\frac{2g}{RT}} \quad (2)$$

where $C_S$ is the sonic discharge coefficient that is equal to $$\left[ \frac{K}{K+1} \left( \frac{2}{K+1} \right)^{2/(K-1)} \right]^{\frac{1}{2}}.$$

For subsonic air flow through the orifice defined by the throttle 16, the mass rate of air flow is defined by the expression:

$$\dot{m} = C_{SS} A \sqrt{\frac{2g}{RT} (P_1^2 - P_1 P_2)} \quad (3)$$

where $C_{SS}$ is the subsonic discharge coefficient, and $P_2$ is the pressure downstream of the throttle 16 and which is substantially equal to the absolute pressure in the manifold 12 of the engine 10. Equation 3 can be rearranged to obtain the following expression:

$$\dot{m} = C_{SS} A P_1 \sqrt{\frac{2g}{RT}} \sqrt{1 - \frac{P_2}{P_1}}. \quad (4)$$

Assuming a constant temperature and by letting the constant $K_1$ equal the expression $$\sqrt{\frac{2g}{RT}}$$

in equations 2 and 4, the equation for the mass rate of air flow into the engine 10 for sonic air flow becomes:

$$\dot{m} = A K_1 P_1 C_S \quad (5)$$

and the equation for the mass rate of air flow into the engine 10 for subsonic air flow becomes:

$$\dot{m} = A K_1 P_1 C_{SS} \sqrt{1 - \frac{P_2}{P_1}}. \quad (6)$$

Figure 4:
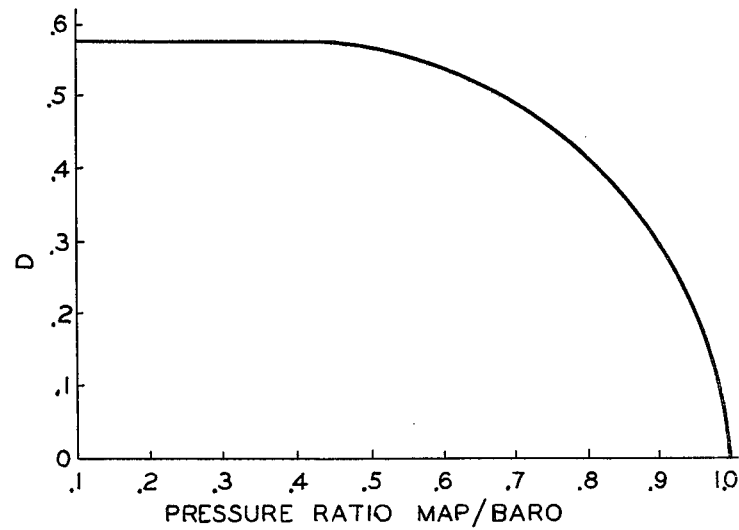
FIG. 4 is a diagram of the pressure ratio dependent driving function stored in the ROM of FIG. 1 and which is used in determining mass air flow in accord with the principles of this invention.

It can be seen that the expressions 5 and 6 for sonic and subsonic flow differ from each other only in a pressure ratio dependent manner. The discharge coefficient $C_S$ in the sonic expression holds for sonic air flow which occurs when the pressure ratio attains a critical value and the expression $$C_{SS} \sqrt{1 - \frac{P_2}{P_1}}$$

varies only with the pressure ratio $P_2/P_1$. By defining a new function D which is equal to $C_S$ for sonic air flow conditions and equal to the expression $$C_{SS} \sqrt{1 - \frac{P_2}{P_1}}$$

for subsonic air flow conditions, the mass rate of air flow expressions for both sonic and subsonic air flows become the single equation:

$$\dot{m} = A \cdot K_1 \cdot P_1 \cdot D \quad (7)$$

where D is an air flow driving function having a value dependent upon the ratio $P_2/P_1$. The value of D does not lend itself to computation primarily because of the discharge coefficient terms $C_S$ and $C_{SS}$. However, the value of D can be determined experimentally as a function of the pressure ratio $P_2/P_1$. FIG. 4 is illustrative of a schedule of values of D for values of $P_2/P_1$ varying from 0 to 1. By selecting values of D as a function of the measured pressure ratio across the throttle 16 in accord with the schedule of FIG. 4, the mass air flow into the engine 10 may be determined by the single equation 7 for both sonic and subsonic air flow conditions. In the digital control system of this embodiment, the schedule of values of D as a function of the pressure ratio $P_2/P_1$ is provided by a lookup table in the ROM 22 that stores values of D at address locations which are addressed by values of the pressure ratio $P_2/P_1$.

Figure 2:
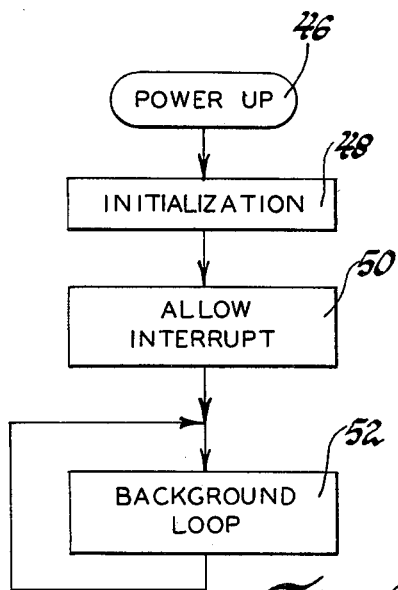
FIGS. 2 and 3 are diagrams illustrative of the operation of the digital system of FIG. 1.
Figure 3:
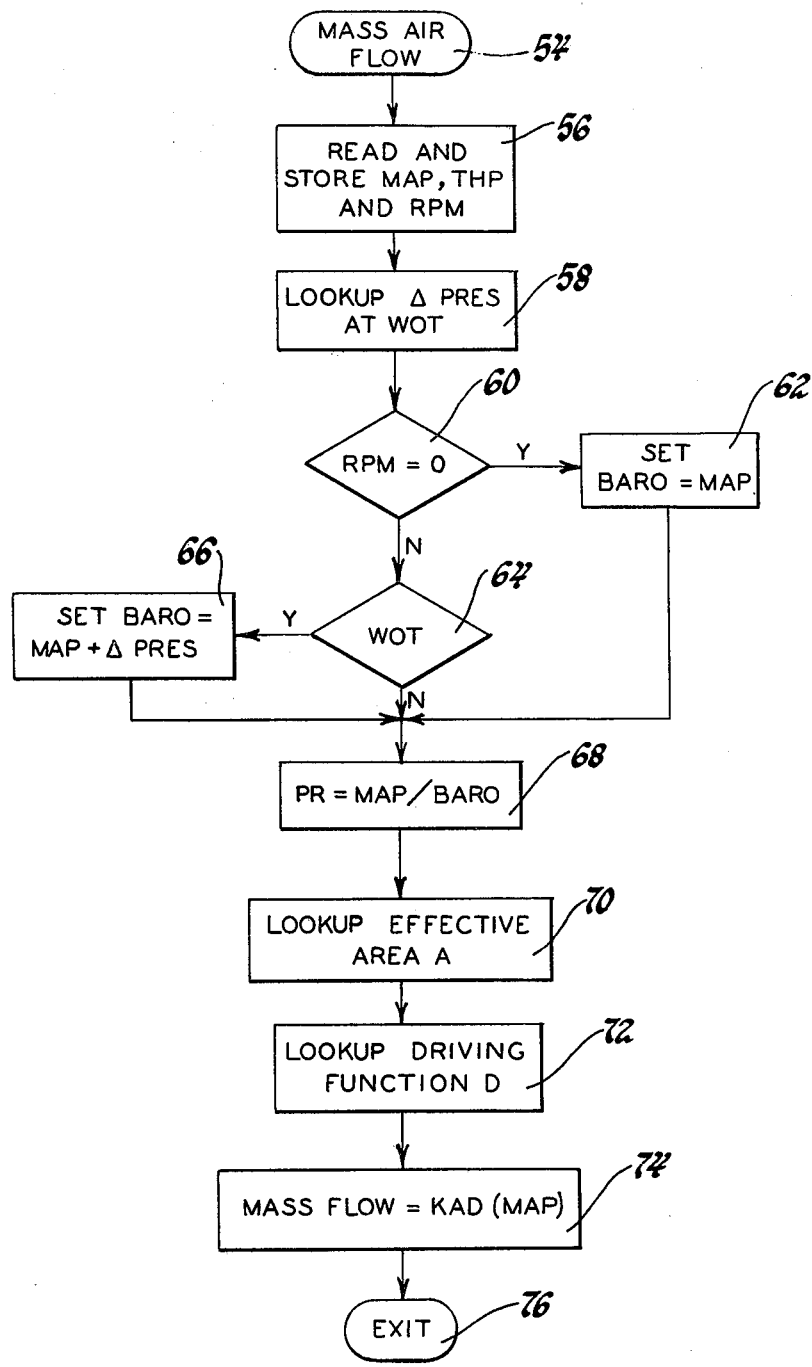

The operation of the digital system of FIG. 1 for determining the mass rate of air flow into the engine 10 in accord with the principles of this invention is illustrated in FIGS. 2 and 3. Referring to FIG. 2, when power is first applied to the system such as upon closure of the vehicle ignition switch (not illustrated), the computer program is initiated at point 46 when power is first applied and then proceeds to a step 48 where the computer provides for initialization of the system. For example, at this step, system initial values stored in the ROM 22 are entered into ROM designated locations in the RAM 24 and counters, flags, and timers are initialized. After the initialization step 48, the program proceeds to step 50 where the program allows interrupts to occur such as by resetting the interrupt mask bit in the microprocessor condition code register. After the step 50, the program shifts to a background loop 52 which is continuously repeated. This loop may include execution of routines such as diagnostic and warning routines.

While the system may employ numerous program interrupts at various spaced intervals, it will be assumed for purposes of illustrating this invention that an interrupt A is provided at 12½ millisecond intervals by means of the divider 28 of FIG. 1 during which the routine for determining the mass rate of air flow into the engine 10 is executed along with other routines such as the routine for determining the fuel injection pulse width establishing a desired air/fuel ratio.

Referring to FIG. 3, the mass air flow routine executed during the interrupt A routine and which is repeated every 12½ millisecond intervals is illustrated. The routine is entered at point 54 and proceeds to a step 56 where the computer executes a read routine where the throttle position and manifold absolute pressure inputs to the analog-to-digital converter/multiplexer 36 are each converted into binary numbers representative of the analog signal values and stored in respective ROM designated locations in the RAM 24. Also, the engine speed value determined by the counter I/O 30 is read and stored in the RAM 24.

The program next proceeds to a step 58 where a lookup routine is executed to retrieve a stored pressure drop value from a lookup table in the ROM 22 addressed as a function of the speed of the engine 10 read and stored at step 56. The retrieved value is a predetermined pressure drop across the throttle 16 when in a wide-open condition at the existing engine speed. The pressure drop value is stored in the RAM 24 and as subsequently described, will be utilized in order to determine the barometric pressure which corresponds to the pressure $P_1$ in equation 7.

From step 58, the program proceeds to a decision point 60 where it is determined whether or not the engine 10 is running. This is accomplished by determining whether or not the engine speed read at step 56 is greater than a predetermined value such as 0. If the engine is not running, the manifold absolute pressure in the intake manifold 12 is equal to the barometric pressure. When this condition is detected, the program proceeds to a step 62 where the barometric pressure stored in a ROM designated location in the RAM 24 is set equal to the manifold absolute pressure read and stored at step 56. This value is thereafter utilized as the pressure $P_1$ above the throttle 16 in equation 7 in the determination computation of the mass air flow into the engine 10. However, if the engine 10 is running so that the manifold absolute pressure is not a measure of the barometric pressure, the program proceeds from decision point 60 to a decision point 64 where it is determined if the throttle position signal represents a wide-open throttle condition. If this condition exists, the program proceeds to a step 66 where the barometric pressure value in the RAM 24 and which is utilized as $P_1$ in equation 7 is set equal to the sum of the manifold absolute pressure value stored at step 56 and the pressure drop value stored in the RAM 24 during the lookup routine of step 58.

Following step 62 and 66 or if the throttle position signal does not indicate a wide-open throttle condition at decision point 64, the program proceeds to a step 68 where the manifold absolute pressure value determined at step 56 is divided by the stored barometric pressure value to provide the pressure ratio $P_2/P_1$. From step 68, the program proceeds to step 70 where the effective orifice area A of the throttle 16 is obtained from a lookup table in the ROM 22 as a function of the value of the throttle position signal THP stored at step 56. Thereafter, the program proceeds to a step 72 where the air flow driving function lookup table in the ROM 22 containing the schedule of values of D is addressed in accord with the pressure ratio $P_2/P_1$ determined at step 68. The retrieved value of the air flow driving function D, the effective orifice area A of the throttle 16 determined at step 70, the pressure value $P_1$ determined at step 62 or step 66 and the stored value $K_1$ are then used at step 74 where the mass rate of air flow is computed to be equal to the expression $AK_1P_1D$. At point 76, the program exits the routine.

In the foregoing manner, the mass rate of air flow into the engine 10 is determined without the addition of complex air flow sensing elements in the air stream and without utilizing complex equations requiring differentiation between sonic and subsonic air flows.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. An air meter for an internal combustion engine having an intake manifold, an induction passage opening from an air inlet to the intake manifold and including a throttle bore and a variable position throttle in the throttle bore for varying the effective area of the induction passage to regulate the air flow into the intake manifold, the air meter comprising, in combination:
   means effective to measure the value $P_1$ of the pressure in the induction passage upstream of the throttle;
   means effective to measure the value $P_2$ of the pressure in the induction passage downstream of the throttle;
   means effective to measure throttle position;
   circuit means responsive to the ratio $P_2/P_1$ effective to provide a schedule of values D that substantially satisfies the expression $C_{SS}\sqrt{1-P_2/P_1}$ for subsonic air flow through the induction passage opening defined by the throttle and substantially equal to $C_S$ for sonic air flow through the induction passage opening defined by the throttle, where $C_{SS}$ is a pressure ratio dependent discharge coefficient and $C_S$ is the sonic flow discharge coefficient;

circuit means responsive to the measured throttle position effective to provide a schedule of values A representing the effective area of the induction passage defined by the throttle;

means responsive to the scheduled values of D and A and the measured value $P_1$ effective to provide an air flow signal that substantially satisfies the expression $A \cdot K_1 \cdot P_1 \cdot D$ where $K_1$ is a constant, the air flow signal being a substantial measure of the mass rate of air flow inducted into the intake manifold through the induction passage.

2. An air meter for an internal combustion engine having an intake manifold, an induction passage opening from an air inlet to the intake manifold and including a throttle bore and a variable position throttle in the throttle bore for varying the effective area of the induction passage to regulate the air flow into the intake manifold, the air meter comprising, in combination:

means effective to measure the value $P_1$ of the pressure in the induction passage upstream of the throttle;

means effective to measure the value $P_2$ of the pressure in the induction passage downstream of the throttle;

means effective to measure throttle position;

first storage means having memory locations addressable by the pressure ratio $P_2/P_1$ and having an air flow driving function value D stored at each memory location representing the pressure ratio influence on the air flow through the induction passage, the stored value of D at each memory location substantially satisfying the expression $C_{SS}\sqrt{1-P_2/P_1}$ for subsonic air flow through the induction passage opening defined by the throttle and substantially equal to $C_S$ for sonic air flow through the induction passage opening defined by the throttle, where $C_{SS}$ is a pressure ratio dependent discharge coefficient and $C_S$ is the sonic flow discharge coefficient;

second storage means having memory locations addressable by the value of throttle position and having a value A stored at each memory location representing the effective area of the induction passage opening defined by the throttle;

means effective to recall the values D and A from the first and second memories in accord with the measured values $P_1$, $P_2$ and throttle position; and means effective to provide an air flow signal that substantially satisfies the expression $A \cdot K_1 \cdot P_1 \cdot D$, where $K_1$ is a constant, the air flow signal being a measure of the air inducted into the intake manifold through the induction passage.

* * * * *